United States Patent [19]

Murray et al.

[11] 4,208,323

[45] Jun. 17, 1980

[54] PROCESS FOR ISOLATION OF PROTEINS USING FOOD GRADE SALT SOLUTIONS AT SPECIFIED PH AND IONIC STRENGTH

[75] Inventors: E. Donald Murray, Winnipeg; Terrence J. Maurice, Colborne; Larry D. Barker, Cobourg; Chester D. Myers, Ajax, all of Canada

[73] Assignee: General Foods, Limited, Toronto, Canada

[21] Appl. No.: 22,229

[22] Filed: Mar. 20, 1979

[30] Foreign Application Priority Data

Mar. 23, 1978 [CA] Canada ................................ 299713

[51] Int. Cl.$^2$ .......................... A23J 1/12; A23J 1/14
[52] U.S. Cl. .......................... 260/112 G; 260/112 R; 260/123.5; 426/656
[58] Field of Search ............. 260/123.5, 112 G, 112 R

[56] References Cited

U.S. PATENT DOCUMENTS

| | | | |
|---|---|---|---|
| 1,245,975 | 11/1917 | Satow | 260/112 R X |
| 1,245,980 | 11/1917 | Satow | 260/112 R X |
| 1,280,862 | 10/1918 | Satow | 260/112 R |
| 2,801,236 | 7/1957 | Miley | 260/112 G UX |
| 2,861,062 | 11/1958 | Borel et al. | 260/112 G X |
| 3,704,131 | 11/1972 | Hampton et al. | 260/112 G UX |
| 3,817,834 | 6/1974 | Wilson | 260/112 R X |
| 3,870,801 | 3/1975 | Tombs | 260/112 R X |
| 3,925,343 | 12/1975 | Hampton et al. | 260/112 G |

FOREIGN PATENT DOCUMENTS

1540376  2/1979  United Kingdom .

*Primary Examiner*—Howard E. Schain
*Attorney, Agent, or Firm*—Sim & McBurney

[57] ABSTRACT

Proteins of high functionality and in substantially undenatured form are isolated in high yield from protein sources by extraction of the protein from the source material using a food grade salt solution under controlled conditions, increasing the protein concentration of the resultant extract while maintaining the same salt concentration, and diluting the concentrated protein solution. Protein isolate in the form of protein micelles forms in the aqueous phase and settles to an amorphous sticky, gluten-like protein mass, which may be dried to powder form.

26 Claims, No Drawings

PROCESS FOR ISOLATION OF PROTEINS USING FOOD GRADE SALT SOLUTIONS AT SPECIFIED PH AND IONIC STRENGTH

FIELD OF INVENTION

The present invention relates to the isolation of proteins from protein sources.

BACKGROUND TO THE INVENTION

In our Canadian Pat. No. 1,028,552 (and its equivalent U.S. Pat. No. 4,169,090), there is described a process for forming protein isolates which comprises subjecting a protein source material to an aqueous food grade salt solution having a salt concentration of at least about 0.2 ionic strength at a temperature of about 15° to about 35° C. and a pH of about 5.5 to about 6.3, diluting the resulting protein solution to an ionic strength of less than about 0.1 to cause the formation of protein micelles in the aqueous phase, and collecting the protein micelles as an amorphous mass of protein isolate.

The latter process is applicable to the isolation of protein from a wide variety of protein source materials in considerably higher yields than are normally attainable using salting-in procedures. The protein isolate derived by the prior process is substantially undenatured and has functionality not exhibited by the source material nor isoelectric precipitates thereof.

The protein extraction from the source material requires the use of a salt solution having an ionic strength of at least 0.2 to effect protein solubilization and ionic strength values up to 0.8 are generally used, as a result of the high degree of dilution required for protein isolation at higher ionic strength values. Sodium chloride usually is used as the extracting salt but any other convenient food grade salt may be used.

The pH range of 5.5 to 6.3 is selected in the prior process, since the micellar form of the isolate is not obtained in any significant amounts at pH values above 6.3 and protein yields fall significantly at higher values and, while the micellar form of the isolate is obtained at pH values below 5.5 down to about 5.0, phosphorus contamination occurs to an unacceptable degree at pH values below 5.5.

SUMMARY OF THE INVENTION

In accordance with the present invention, the yield of protein isolate which may be obtained by the prior process is increased by increasing the protein concentration of the protein solution obtained in the extraction step while the salt concentration thereof remains the same prior to the dilution step. This concentration step also enables the protein isolation process to be effected over wider ranges of some of the parameters.

Accordingly, the present invention provides a process of preparing a protein isolate from a protein source material, which comprises: (a) extracting the protein source material with an aqueous food grade salt solution having an ionic strength of at least about 0.2 and at a pH of about 5 to about 6.8, at a temperature of about 15° to about 35° C. to cause solubilization of protein material in said protein source material and form a protein solution, (b) increasing the protein concentration of said protein solution while maintaining the ionic strength substantially constant, (c) diluting the concentrated protein solution to an ionic strength below about 0.2 to cause the formation of protein micelles in the aqueous phase, and (d) settling the protein micelles as an amorphous sticky gelatinous gluten-like protein micellar mass. The protein isolate so formed, after separation from residual aqueous phase, may be dried to a powder form.

GENERAL DESCRIPTION OF INVENTION

The initial step of the process of this invention involves solubilization of proteins in the source material. The protein source material may vary widely, including plant proteins, for example, starchy cereals, such as, wheat, corn, oats, rye, barley and triticale; starchy legumes, such as field peas, chick peas, fababeans, navy beans and pinto beans; and oil seeds, such as sunflower seeds, peanuts, rapeseed and soy beans; animal proteins, such as, serum proteins; and microbial proteins. Plant proteins are preferred, since they are readily available.

The protein source material usually is comminuted by any convenient technique prior to effecting the protein extraction thereon. The average particle size of the comminuted material may vary widely, generally between about 10 and about 800 mesh, preferably less than about 200 mesh. The comminution may be accompanied by physical removal of some non-proteinaceous material by conventional techniques.

A food grade salt solution is used in the protein solubilization, and the food grade salt usually is sodium chloride, although other salts, such as, potassium chloride or calcium chloride, may be used. The food grade salt solution has an ionic strength of at least about 0.2 to enable solubilization of significant quantities of protein to be effected. As the ionic strength of the salt solution increases, the degree of solubilization of protein in the source material initially increases until a maximum value is achieved. Any subsequent increase in ionic strength does not increase the protein solubilization. The ionic strength of the food grade salt solution which causes maximum protein solubilization varies depending on the salt concerned and the protein source chosen.

In view of the greater degree of dilution required with increasing ionic strengths, it is usually preferred to utilize an ionic strength value less than about 0.8, and more preferably a value of about 0.3 to about 0.6. Ionic strength values up to 5.0, however, have been used.

The salt solubilization of the protein is effected at a temperature of about 15° to about 35° C., preferably accompanied by agitation to decrease the solubilization time, which is usually about 10 to about 60 minutes. It is preferred to effect the solubilization to extract substantially the maximum amount of protein from the source material.

The lower temperature limit of about 15° C. is chosen since solubilization is impractically slow below this temperature while the upper temperature limit of about 35° C. is chosen since microbial growth becomes unacceptably rapid above this temperature.

The aqueous food grade salt solution has a pH of about 5 to about 6.8 to enable the protein isolate to be formed by the micellar route, described in more detail below. The optimum pH value for maximum yield of protein isolate varies depending on the protein source material chosen.

At and close to the limits of the pH range, protein isolate formation occurs only partly through the micelle route and in lower yields than attainable elsewhere in the pH range. For these reasons, pH values of about 5.3 to 6.2 are preferred.

The pH of the food grade salt solution may be adjusted to any desired value within the range of about 5 to about 6.8 for use in the extraction step by the use of any convenient food grade acid, usually hydrochloric acid, or food grade alkali, usually sodium hydroxide, as required.

The concentration of protein source material in the food grade salt solution during the solubilization step may vary widely. Typical concentration values are about 5 to about 15% w/v.

Once the protein extraction operation has been effected, the protein solution is separated from solid phase extracted protein material. The protein solution, usually having a protein concentration of about 10 to about 100 g/l, preferably about 30 to about 70 g/l, then is concentrated to increase the protein concentration thereof while maintaining the ionic strength thereof substantially constant.

The concentration step may be effected by any convenient selective membrane technique, such as, ultrafiltration or diafiltration. The concentration step has the beneficial effect of increasing the yield of isolate which may be obtained from the process, and thereby increasing the overall efficiency of the protein isolation process.

The degree of concentration of the protein solution can be termed the "concentration factor" or more properly "volume reduction factor". As the volume reduction factor, expressed as the ratio of the volume of the solution prior to concentration to the volume of concentrated solution, and hence the protein concentration increases from 1.0, the attainable yield increases until a maximum is reached.

Once the maximum attainable yield is reached, further decreases in volume of concentrated solution are beneficial only with respect to the volume of liquid required for subsequent dilution during the protein isolation step.

The volume reduction factor at which the maximum attainable yield is reached is dependent on the protein source material concerned and the pH of the protein solution. It is preferred to use a volume reduction factor of 3.0 to 4.0, since the maximum attainable yield frequently results from the use of these values. A volume reduction factor of at least 1.1 usually is used and as the volume reduction factors become quite high, usually about 5.0 to 6.0, the viscosity of the protein solution becomes quite high, which may lead to difficulties in later processing, thereby inhibiting the utilization of greater values.

The concentrations may be effected at any convenient temperature, typically about 20° to about 50° C., and for the period of time to effect the desired degree of concentration. The temperature and other conditions used to some degree depend upon the membrane equipment used to effect the concentration.

The concentrating of the protein solution in this step not only increases the overall process yield but also decreases the salt concentration of the protein isolate after drying. The ability to control the salt concentration of the isolate is important in applications of the isolate where variations in salt concentrations affect the properties. As set forth in more detail in our copending U.S. patent application Ser. No. 22,097 filed concurrently herewith, the binding capacity of the isolate decreases as salt concentrations increase.

The concentration step enables the upper limit of pH of the extraction step to be increased to about 6.8 from about 6.3, although such higher values are less preferred, for the reasons discussed above.

As is well known, ultrafiltration and similar selective membrane techniques permit low molecular weight species to pass therethrough while preventing higher molecular weight species from so doing. The low molecular weight species include not only the ionic species of the food grade salt but also low molecular weight materials extracted from the source material, such as, carbohydrates. The molecular weight cut-off of the membrane is usually chosen to ensure retention of substantially all of the proteins in the solution.

The elimination of the low molecular species from the extracted solution during the concentration step permits the protein concentration to be increased without precipitation thereof, beyond the maximum concentration attainable during the extraction step.

As mentioned previously, one of the difficulties of the prior process in using pH values from 5.0 to 5.5 is the phosphorus content of the isolate, mainly in the form of phytic acid. As the quantity of phytic acid in the isolate increases, the digestibility of the isolate is increasingly adversely affected. It is preferred, therefore, to decrease the phosphorus content of the isolate to the greatest extent possible.

It has been found that, while the concentration of the protein solution does not affect the phosphorus content of the final protein isolate to any significant degree, when the concentration step is combined with at least one "washing" step, then the phosphorus content of the isolate obtained in the pH range of about 5 to 5.5 is significantly decreased, enabling the process to be used over a broader pH range than defined in the above-mentioned prior patent.

The "washing" step effected in accordance with this embodiment of the invention may be effected by first concentrating the protein solution, diluting the concentrated protein solution with food grade salt solution while maintaining the protein in a dispersed state, and subsequently reconcentrating the diluted protein solution to increase the protein concentration thereof while maintaining the ionic strength substantially constant. The dilution and reconcentration operations may be repeated, if desired, until the maximum decrease in phosphorus concentration is attained, if the latter has not been achieved in the initial "washing" step.

The dilution of the concentrated protein solution while maintaining the protein in a dispersed state is usually effected to provide substantially the same protein concentration in the diluted solution as prior to the concentration step, usually by using the same volume of salt solution as removed in the concentration step and having the same ionic strength as the concentrated solution, so that the dilution is effected with substantially no change in ionic strength.

The reconcentration of the diluted protein solution is usually effected by the same volume reduction factor as the initial concentration step, with the ionic strength remaining substantially constant, although a different volume reduction factor may be used, if desired.

The "washing" operation may also be effected in an alternative manner by continuously feeding food grade salt solution into the protein solution resulting from the extraction step while the latter is subjected to concentration by a membrane technique to remove salt solution at the same rate.

In the latter procedure, the volume of protein solution and the ionic strength thereof remain the same during the addition of food grade salt solution until the "washing" has achieved the desired degree of phosphorus removal. The addition of fresh food grade salt solution then is terminated and the washed protein solution concentrated to the desired degree for further processing.

The combination of the washing and concentration steps significantly decreases the phosphorus concentration of the isolate over the 5.0 to 5.5 pH range, providing practicality to the utilization of those pH values for protein extraction.

The overall protein isolation process decreases the phosphorus content of the initial protein source material, which is not the case in the isoelectric protein precipitation process, where an increase may occur.

The phosphorus concentration decreases by about 20 to 30% by weight of that in the source material in the pH range of 5.0 to 5.5 without the "washing" step although decreases of about 40 to 50% are attained above pH 5.5. The at least one "washing" step permits similar phosphorus level decreases to be attained, usually to a value less than about 0.8 wt. % and preferably less than 0.5 wt. %.

The concentrated protein solution resulting from the concentration step or combined concentration and washing steps, whichever procedure is adopted, generally having a protein concentration of about 40 to about 200 g/l, depending on the initial protein concentration and the volume reduction factor used, is diluted to an ionic strength of less than about 0.2, generally by passing the concentrated protein solution into a body of water having the volume required to achieve the ionic strength decrease.

The body of water into which the concentrated protein solution is fed usually has a temperature less than about 25° C. and preferably has a temperature of about 5° to about 15° C., since improved yields of protein isolate are attained with these colder temperatures.

The decrease in ionic strength causes the formation of a cloud-like mass of discrete protein droplets in micellar form. The protein micelles are allowed to settle to form a coalesced dense amorphous sticky gluten-like protein isolate mass. The settling may be induced, such as by centrifugation. Such induced settling decreases the liquid content of the protein isolate mass, thereby decreasing the moisture content generally from about 70% by weight to about 95% by weight to a value of generally about 50% by weight to about 80% by weight. Decreasing the moisture content of the isolate mass in this way also decreases the occluded salt content of the isolate, and hence the salt content of dried isolate.

As mentioned above, the salt concentration of the isolate affects its utility in certain applications, particularly its use as a food component binder. Centrifugation combined with concentration of the protein solution minimize the salt concentration of the isolate and hence maximize the binding capacity of the isolate.

The ionic strength to which the concentrated protein solution is diluted below about 0.2 affects the efficiency of micellization and hence the yield of isolate which is attained. For this reason, the ionic strength usually is decreased to a value less than about 0.15 and preferably less than about 0.1. The ability to attain good yields of protein isolate in the ionic strength range of about 0.1 to about 0.2 in this invention contrasts markedly with the above-mentioned prior art procedure where the ionic strength must be decreased below 0.1 to achieve reasonable yields.

The dilution is preferably effected to an ionic strength in the range of about 0.06 to about 0.12, since optimum yields are attainable in this range, and excessive volumes of water for no additional benefit are required for an ionic strength below about 0.06. The lower limit of ionic strength for the diluted protein solution is dictated more by practical economic considerations of liquor volume than by process operability considerations.

The settled isolate in the form of an amorphous, sticky, gelatinous, gluten-like protein mass, termed "protein micellar mass", or PMM, is separated from the aqueous phase. The PMM may be used in the wet form or may be dried, by any convenient technique, such as spray drying, freeze drying or vacuum drum drying, to a dry form. The dry PMM has a high protein content, usually in excess of about 95% protein (calculated as kjeldahl $N \times 6.25$), and is substantially undenatured (as determined by differential scanning calorimetry).

The process of this invention shares the merits of mild processing with the prior art process to achieve an undenatured protein isolate of high functionality but improves thereon in increasing the protein isolate yield and enabling phosphorus levels to be controlled sufficiently to expand the usable pH range. The yield can be optimized for any particular source material by selection of appropriate conditions in accordance with the above detailed discussion of each of the steps of the process.

The PMM may be used in conventional applications of protein isolates, such as, protein fortification of processed foods, emulsification of oils, body formers in baked goods and foaming agents in products which entrap gases.

However, the PMM also has functionality not exhibited by the source protein and isoelectric precipitates thereof. The PMM may be formed into protein fibers, useful in meat analogs, and may be used as an egg white substitute or extender in food products where egg white is used as a binder or as a wheat gluten substitute or extender in wheat-based products.

EXAMPLES

Example I

This Example illustrates the process of the invention and the effect of variations in volume reduction factor on salt concentration.

A protein concentrate (about 50 wt. % protein) of field peas was mixed with an 0.4 molar sodium chloride solution at a 10% w/v level at a temperature of about 25° C. The mixture was stirred for about 25 minutes at a pH of about 6.0. The aqueous protein extract was separated from residual solid matter and had a protein concentration of about 40 mg/ml.

The extract then was concentrated on an ultrafiltration unit using two "ROMICON" (Trademark) type XM50 cartridges over a processing period of about 40 minutes at a temperature of about 45° C. The "ROMICON" ultrafiltration cartridge is manufactured by Rohm and Haas Company, the designation "50" referring to a molecular weight cut-off of 50,000. Concentrates at various volume reduction factors (i.e., the ratio of initial volume to that of concentrated solution) in the range of 3.0 to 5.0 were prepared and these concentrates had a pH of about 6.0 to 6.3.

The concentrates were each diluted into cold water having a temperature of about 8° C. at a volume ratio of 1 to 5 (i.e. 1 part of concentrate to 5 parts of water) i.e. to an ionic strength of about 0.07. Immediately upon dilution, a white cloud of protein isolate observed to be in the form of protein micelles formed in the dilution system. The protein micelles were allowed to settle as a highly viscous amorphous gelatinous precipitate in the bottom of the vessel.

The wet PMM recovered from the supernatant liquid was spray dried to provide a dry powder product which was analyzed for salt, moisture and protein. Overall protein yields of about 35 to 40% were obtained, based on the initial protein over the tested volume reduction factor range, as compared with a yield of about 20% for the equivalent process but omitting the concentration step.

The following Table I reproduces the protein and salt analysis results for the dry PMM, as compared with a dry PMM formed by the equivalent procedure omitting the concentration step:

TABLE I

| Volume Reduction Factor | Protein Weight % | Salt Content Dry PMM Wt. % |
| --- | --- | --- |
| 1.0 | 83.2 | 5.36 |
| 3.19 | 88.2 | 5.68 |
| 3.49 | 94.2 | 1.87 |
| 3.76 | 95.2 | 2.36 |
| 4.06 | 90.0 | 3.61 |
| 4.08 | 91.0 | 3.11 |
| 4.42 | 91.5 | 2.21 |
| 4.76 | 95.5 | 1.52 |
| 4.80 | 93.9 | 2.57 |
| 5.04 | 97.1 | 1.71 |

The results of the above Table I demonstrate that the purity of the PMM (in terms of protein content) increases and the sodium chloride content decreases when volume reduction factors above about 3.5 to 5 are employed.

EXAMPLE II

This Example illustrates the effect of centrifugation on the salt concentration in the protein isolate.

Following formation of the white cloud of protein micelles in the dilution system from a protein solution formed by the procedure of Example I and concentrated by a volume reduction factor of 5, the dilution system was centrifuged at 5000 xg for 10 minutes to form a highly viscous amorphous gelatinous precipitate in the bottom of the vessel. The supernatant liquid and wet PMM were separated and the wet PMM was spray dried and analyzed for salt and protein.

The following Table II reproduces the analytical results for the dry PMM samples as compared with dry PMM samples formed by the equivalent procedure omitting the centrifuging step.

TABLE II

| Protein Weight % Centrifuge | | Salt Content Dry PMM wt. % | |
| --- | --- | --- | --- |
| With | Without | With | Without |
| 99% | 96.7 | 0.12 | 1.73 |

The results of the above Table II indicate that a significant decrease in salt concentration is effected utilizing the centrifugation step.

EXAMPLE III

This Example illustrates the effect of pH of extraction on overall process yield.

A series of experiments was effected generally following the procedure of Example I and the yield of protein isolate was determined in each instance.

In one group of experiments, fababean concentrate was extracted with 0.35 M sodium chloride solution at varying pH values from 4.6 to 7.0 for 45 minutes at 35° C.

After subjecting the protein solution to ultrafiltration to provide a volume reduction factor of 3.5, the concentrated protein solution was diluted 1 to 2.5 (to an ionic strength of 0.1) to form a cloud of protein particles. The form of the protein isolate in the cloud was observed microscopically. The protein isolate was settled by centrifugation, separated from supernatant liquid and spray dried to a powder.

In another group of experiments, the procedure of the first group was repeated except that the ultrafiltration step was omitted.

The results obtained are reproduced in the following Table III:

TABLE III

| | Overall Process Yield (%) | | Form of Isolate |
| --- | --- | --- | --- |
| pH | With Ultra-filtration | No Ultra-filtration | (Ultrafiltration group only) |
| 4.6 | 22.0 | 19.7 | less than 10% micelles, mostly particulate |
| 4.8 | 29.5 | 23.6 | about 10 to 20% micelles, mostly particulate |
| 5.0 | 39.4 | 31.5 | about 40 to 50% small micelles |
| 5.2 | 62.0 | 47.2 | greater than 80% small micelles |
| 5.4 | 57.8 | 49.7 | greater than 80% small micelles |
| 5.6 | 67.0 | 53.2 | greater than 80% large and small micelles |
| 5.8 | 63.0 | 51.4 | greater than 80% large and small micelles |
| 6.0 | 59.4 | 49.7 | greater than 80% small micelles |
| 6.2 | 54.3 | 47.7 | greater than 80% small micelles |
| 6.4 | 54.2 | 42.1 | greater than 80% small micelles |
| 6.6 | 48.9 | 38.2 | about 40 to 50% small and large micelles |
| 6.8 | 42.7 | 30.7 | about 40 to 50% small and large micelles |
| 7.0 | 27.9 | 17.3 | Less than 10% micelles |

The results of the above Table III illustrate that improved yields are attained using ultrafiltration over a wide pH range but that protein micellar mass is attained over a restricted pH range.

EXAMPLE IV

The procedure of Example III was repeated except that field peas were used in place of faba beans. Yield determinations were made on a spot basis only over the pH range from 4.5 to 7.0. The results are reproduced in the following Table IV:

TABLE IV

| | Overall Process Yield (%) | | |
| --- | --- | --- | --- |
| pH | With Ultra-filtration | No Ultra-filtration | Form of Isolate |
| 5.0 | 34.2 | 24.9 | about 40 to 50% small micelles |

TABLE IV-continued

| | Overall Process Yield (%) | | |
|---|---|---|---|
| pH | With Ultra-filtration | No Ultra-filtration | Form of Isolate |
| 5.7 | 66.5 | 46.3 | greater than 80% small micelles |
| 6.0 | 69.7 | 43.2 | greater than 80% small micelles |
| 6.6 | 45.5 | 32.6 | greater than 80% small and medium micelles |
| 6.8 | 38.6 | 22.3 | greater than 80% small and medium micelles. |
| 7.0 | 29.3 | 11.4 | no micelles |

The results of the above Table IV corroborate those of Table III with respect to yield improvements and protein isolate form.

EXAMPLE V

This Example illustrates the effect of concentration and combined effect of concentration and washing on phosphorus concentration of isolate.

The procedure of Example III was repeated except that varying pH values were used in the extraction step and, in one group of experiments, the concentrated protein solution was diluted with 0.35 M sodium chloride solution and again subjected to ultrafiltration to concentrate the diluted solution by a volume reduction factor of 3.5, while these steps were omitted from a second group of experiments. In each case, the phosphorus concentration in the dry isolate was determined and compared with that in the starting protein concentrate, which contained 0.82% phosphorus.

The results are produced in the following Table V:

TABLE V

| | % Change in P content relative to starting material and absolute value | | | | | |
|---|---|---|---|---|---|---|
| | No UF | | With UF | | With UF + washing | |
| pH | % P | Change | % P | Change | % P | Change |
| 4.8 | 0.72 | −12.2 | 0.70 | −14.6 | 0.46 | −43.9 |
| 5.0 | 0.55 | −32.9 | 0.57 | −30.4 | 0.42 | −47.6 |
| 5.2 | 0.55 | −32.9 | 0.45 | −45.1 | 0.39 | −52.4 |
| 5.4 | 0.41 | −50.0 | 0.45 | −45.1 | 0.39 | −51.2 |

(UF = ultrafiltration)

The results of Table V show that the ultrafiltration alone has little effect on phosphorus concentration but that washing along with ultrafiltration produces significantly improved phosphorus level decreases up to pH 5.4.

EXAMPLE VI

This Example illustrates the effect of volume reduction factor on yield.

The procedure of Example III was repeated on field peas at various volume reduction factors at pH values of 5.0 and 5.7. The yield of the dilution step was determined in each case. The following Table VI reproduces the results:

TABLE VI

| pH | 5.0 | 5.7 |
|---|---|---|
| VRF[1] | Dilution Yield % | Dilution Yield % |
| 1.0 | 45.6 | 46.1 |
| 2.0 | 51.5 | 63.1 |
| 2.5 | 48.7 | 61.9 |
| 3.0 | 46.6 | 73.4 |
| 3.5 | 62.6 | 66.2 |
| 4.0 | 64.0 | 76.6 |
| 5.0 | 64.0 | 55.4[2] |

TABLE VI-continued

| pH | 5.0 | 5.7 |
|---|---|---|
| VRF[1] | Dilution Yield % | Dilution Yield % |
| 6.0 | 66.0 | 71.7 |

Note:
[1]VRF is volume reduction factor
[2]This result is anomolous

The results of the above Table VI indicate that an increase in volume reduction factor leads to an increase in yield of the dilution step, up to a maximum yield level after which increases in volume reduction factor do not result in any significant yield improvement.

EXAMPLE VII

This Example illustrates the effect of varying degrees of dilution or dilution step yield.

The procedure of Example III was repeated using the same two groups of experiments outlined therein, except that instead of varying pH, a pH of 6.0 was used, and the protein solution was diluted to varying final ionic strength values. The dilution yield of protein isolates was determined in each case.

The results obtained are reproduced in the following Table VII:

TABLE VII

| Ionic Strength of Diluted Solution | Dilution Yield % | |
|---|---|---|
| | With U.F. | Without U.F. |
| 0.2 | 39.8 | 10.4 |
| 0.18 | 38.4 | 17.8 |
| 0.15 | 43.4 | 28.4 |
| 0.12 | 52.9 | 34.3 |
| 0.10 | 57.9 | 35.9 |
| 0.08 | 59.4 | 39.6 |
| 0.06 | 60.9 | 44.6 |

As can be seen from the results of the above Table VII, when ultrafiltration is used, the yield from the dilution step is quite high (of the order of 40%) at an ionic strength of 0.2 and increases as the degree of dilution increases. In the absence of ultrafiltration, low dilution yields are realized at ionic strength values of 0.1 and above.

EXAMPLE VIII

This Example illustrates the effect of ionic strength of salt solution on process yield.

The process of Example III was repeated using a pH of 6.0 and various ionic strength values for the salt solution used in the protein extraction step. To simplify procedures, no ultrafiltration was effected. The yield values were determined and are reproduced in the following Table VIII:

TABLE VIII

| Ionic Strength NaCl Solution | Process Yield % |
|---|---|
| 0.2 | 30.0 |
| 0.3 | 39.8 |
| 0.4 | 42.3 |
| 0.5 | 40.8 |
| 0.6 | 40.2 |
| 0.7 | 44.9 |
| 0.8 | 45.3 |
| 0.9 | 44.4 |
| 1.0 | 35.5 |
| 1.3 | 39.9 |
| 1.5 | 40.4 |
| 2.0 | 38.9 |
| 2.5 | 30.3 |

TABLE VIII-continued

| Ionic Strength NaCl Solution | Process Yield % |
|---|---|
| 3.0 | 24.8 |
| 4.0 | 39.7 |
| 5.0 | 37.7 |

The results of the above Table VIII indicate that as the ionic strength of the extraction solution increases, the quantity protein solubilized increases initially but in the 0.3 to 0.4 range reaches a maximum which is substantially maintained throughout the tested range.

SUMMARY OF DISCLOSURE

In summary of this disclosure, the present invention provides a protein isolation process which enables an undenatured protein isolate of high functionality to be separated in increased yield. Modifications are possible within the scope of the invention.

What we claim is:

1. A process of preparing a protein isolate, which comprises:
   (a) extracting a protein source material with an aqueous food grade salt solution having an ionic strength of at least about 0.2 and a pH value of about 5 to about 6.8 at a temperature of about 15° to about 35° C. to cause solubilization of protein in said protein source material and form a protein solution;
   (b) increasing the protein concentration of said protein solution while maintaining the ionic strength thereof substantially constant;
   (c) diluting the concentrated protein solution to an ionic strength below about 0.2 to cause the formation of discrete protein particles in the aqueous phase at least partially in the form of protein micelles, and
   (d) settling the protein particles to form a mass of protein isolate at least partially in the form of an amorphous sticky gelatinous gluten-like protein micellar mass.

2. The process of claim 1 including the further steps of
   (e) separating the protein isolate from supernatant aqueous phase; and
   (f) drying the separated isolate to powder form.

3. The process of claim 1 wherein said aqueous food grade salt solution has an ionic strength of about 0.2 to about 0.8.

4. The process of claim 3 wherein said ionic strength is about 0.3 to 0.6.

5. The process of claim 1 or 2 wherein said pH range is about 5.3 to about 6.2, said discrete protein particles are substantially completely in the form of said protein micelles, and said protein isolate mass consists essentially of said protein micellar mass.

6. The process of claim 1, 2 or 3 wherein said extraction is effected with agitation or particulated proteinaceous source material for about 10 to about 60 minutes at a concentration of about 5 to about 15% w/v protein source material to solubilize substantially the maximum amount of protein from said source material and form a protein solution containing about 10 to 100 g/l of protein.

7. The process of claim 1 wherein said protein concentration is increased by a volume reduction factor of at least about 1.1, determined as the ratio of volume of said protein solution to the volume of concentrated protein solution.

8. The process of claim 7 wherein said volume reduction factor is from about 2.0 to about 6.0.

9. The process of claim 1, 2, 3 or 7 wherein said concentrated protein solution is diluted to an ionic strength of about 0.06 to about 0.12.

10. The process of claim 1 wherein said dilution step is effected by passing said concentrated protein solution into a body of water having a volume sufficient to provide said ionic strength below about 0.2.

11. The process of claim 10 wherein said body of water has a temperature below about 25° C.

12. The process of claim 11 wherein said body of water has a temperature of about 5° to about 15° C.

13. The process of claim 1, 2, 3, 7 or 10 including centrifuging said protein particles during said settling to assist in said settling step.

14. The process of claim 1, 2, 3, 7 or 10 wherein said aqueous food grade salt solution has a pH of about 5 to about 5.5 and the phosphorus content of said protein solution is decreased prior to said dilution step.

15. A process of preparing a protein isolate, which comprises:
   (a) extracting a particulated protein source material selected from the group consisting of cereals, legumes and oil seeds by agitation with an aqueous sodium chloride solution having an ionic strength of about 0.2 to about 0.8 and a pH of about 5.3 to about 6.2 at a temperature of about 15° to about 35° C. for about 10 to about 60 minutes to cause solubilization of protein in said protein source material and form a protein solution containing about 10 to about 100 g/l of protein,
   (b) separating the protein solution from residual solid phase,
   (c) concentrating the separated protein solution by a membrane technique to increase the protein concentration thereof while maintaining the ionic strength substantially constant, said concentration being effected at a volume reduction factor of about 1.1 to about 6.0, as determined by the ratio of the volume of protein solution and the volume of concentrated protein solution,
   (d) passing the concentrated protein solution into a body of water having a temperature below about 25° C. and a volume sufficient to decrease the ionic strength of the concentrated protein solution to a value of about 0.06 to about 0.12 to cause the formation of a cloud of discrete protein micelles in the aqueous phase,
   (e) settling the protein micelles into an amorphous sticky gelatinous gluten-like protein micellar mass, and
   (f) separating the protein micellar mass from the aqueous phase.

16. The process of claim 15 wherein said extraction step is effected to solubilize the maximum possble quantity of protein from said protein source material.

17. The process of claim 15 wherein said aqueous sodium chloride solution has an ionic strength of about 0.3 to about 0.4 and said extraction is carried out at a solids concentration of about 5 to about 15% w/v.

18. The process of claim 15 wherein said volume reduction factor is about 2.0 to about 5.0.

19. The process of claim 15 wherein said body of water has a temperature of about 5° to about 15° C.

20. The process of claim 15 wherein said aqueous sodium chloride solution has an ionic strength of about 0.3 to about 0.4, said extraction is carried out at a solids concentration of about 5 to about 15% w/v, the volume reduction factor to about 2.0 to about 5.0, and said body of water has a temperature of about 5° to about 15° C.

21. The process of claim 15, 16, 17, 18, 19 or 20 including the step of centrifuging said body of water during said settling step to increase the rate of settling and decrease the occluded water concentration in said protein micellar mass.

22. The process of claim 21, including the further step of
(g) drying said separated protein micellar mass to form a powdered protein isolate.

23. A process of preparing a protein isolate, which comprises:
(a) extracting a protein source material with an aqueous food grade salt solution having an ionic strength of at least about 0.2 and a pH of about 5 to about 5.5 at a temperature of about 15° to about 35° C. to cause solubilization of protein in said protein source material and form a protein solution;
(b) decreasing the phosphorus concentration in the solubilized protein;
(c) increasing the protein concentration of said protein solution while maintaining the ionic strength thereof substantially constant;
(d) diluting the concentrated protein solution to an ionic strength below about 0.2 to cause the formation of discrete protein particles in the aqueous phase at least partially in the form of protein micelles; and
(e) settling the protein micelles to form a mass of protein isolate at least partially in the form of an amorphous sticky gelatinous gluten-like protein micellar mass.

24. The process of claim 23 wherein said steps of decreasing the phosphorus concentration and increasing the protein concentration of said protein solution are effected by:
(f) increasing the protein concentration of said protein solution while maintaining the ionic strength thereof substantially constant;
(g) diluting said concentrated protein solution to the protein concentration of said protein solution while maintaining the ionic strength thereof substantially constant; and
(h) increasing the protein concentration of said diluted solution while maintaining the ionic strength thereof substantially constant.

25. The process of claim 23 wherein said steps of decreasing the phosphorus concentration and increasing the protein concentration of the protein solution are effected by:
(i) continuously adding aqueous food grade salt solution to said protein solution while continuously removing an equivalent volume of liquor and maintaining the protein concentration and the ionic strength of the protein solution substantially constant for a time at least sufficient to decrease the phosphorus content of said solubilized protein; and thereafter
(j) concentrating the so-treated protein solution to increase the protein concentration thereof while maintaining the ionic strength thereof substantially constant.

26. The process of claim 23, 24 or 25, including the additional steps of
(k) separating said settled protein micellar mass from supernatant liquor; and
(l) drying said separated protein micellar mass to a powder form.

* * * * *